(12) United States Patent
Kazmirski

(10) Patent No.: US 6,793,049 B2
(45) Date of Patent: *Sep. 21, 2004

(54) ACCELERATION SENSITIVE DAMPING FOR AUTOMOTIVE DAMPERS

(75) Inventor: Karl Kazmirski, Toledo, OH (US)

(73) Assignee: Tenneco Automotive Operating Company, Inc., Lake Forest, IL (US)

( * ) Notice: Subject to any disclaimer, the term of this patent is extended or adjusted under 35 U.S.C. 154(b) by 10 days.

This patent is subject to a terminal disclaimer.

(21) Appl. No.: 10/425,127

(22) Filed: Apr. 28, 2003

(65) Prior Publication Data

US 2003/0192753 A1 Oct. 16, 2003

Related U.S. Application Data

(62) Division of application No. 09/992,309, filed on Nov. 19, 2001, now Pat. No. 6,581,733.

(51) Int. Cl.[7] .................................................. F16F 9/34
(52) U.S. Cl. .................... 188/275; 188/266.6; 188/315; 188/322.14; 188/322.2
(58) Field of Search ................................ 188/275, 313, 188/314, 315, 266.5, 266.6, 282.5, 282.8, 318, 322.14

(56) References Cited

U.S. PATENT DOCUMENTS

| | | |
|---|---|---|
| 1,281,079 A | 10/1918 | Sears |
| 1,992,525 A | 2/1935 | Funston |
| 1,995,901 A | 3/1935 | Rossman et al. |
| 2,015,453 A | 9/1935 | Kindl et al. |
| 2,098,387 A | 11/1937 | Mercier |
| 2,140,359 A | 12/1938 | Hanna |
| 2,252,772 A | 8/1941 | Katcher |
| 2,329,803 A | 9/1943 | Whisler, Jr. |
| 2,774,448 A | 12/1956 | Hultin |
| 2,957,703 A | 10/1960 | Ross |
| 3,127,958 A * | 4/1964 | Szostak ...................... 188/275 |
| 3,338,347 A | 8/1967 | Avner |
| 3,414,092 A | 12/1968 | Speckhart |
| 3,696,894 A | 10/1972 | Brady et al. |
| 4,356,898 A | 11/1982 | Guzder et al. |
| 4,589,528 A | 5/1986 | Axthammer et al. ...... 188/266.2 |
| 4,902,034 A | 2/1990 | Maguran et al. ............ 280/707 |
| 4,917,222 A | 4/1990 | Bacardit |
| 5,285,875 A * | 2/1994 | Munoz ....................... 188/275 |
| 5,462,140 A * | 10/1995 | Cazort et al. ............... 188/275 |
| 5,598,903 A | 2/1997 | Richardson |
| 5,992,585 A * | 11/1999 | Kazmirski et al. ...... 188/322.14 |
| 6,119,830 A * | 9/2000 | Richardson et al. ........ 188/275 |
| 6,253,888 B1 | 7/2001 | Bell et al. .................... 188/275 |
| 6,290,035 B1 * | 9/2001 | Kazmirski et al. ...... 188/322.14 |
| 6,334,516 B1 * | 1/2002 | Shirley et al. .............. 188/275 |
| 6,581,733 B2 * | 6/2003 | Kazmirski .................. 188/275 |

FOREIGN PATENT DOCUMENTS

JP      5-141468 A    *   6/1993      ............ 188/322.14

* cited by examiner

Primary Examiner—Matthew C. Graham
Assistant Examiner—Mariano Sy
(74) Attorney, Agent, or Firm—Harness, Dickey & Pierce, PLC

(57) ABSTRACT

A shock absorber having a pair of valve assemblies which include an acceleration sensitive valve which couples the working chamber of the shock absorber to the shock absorber's reservoir chamber through a fluid path to provide a soft damping characteristic for the shock when the shock absorber experiences acceleration beyond a specific amount. A compression valve assembly and a rebound valve assembly are also provided which controls the fluid flow through the piston and the base assembly, respectively, to provide a firm damping characteristic for the shock absorber during low acceleration movement.

7 Claims, 2 Drawing Sheets

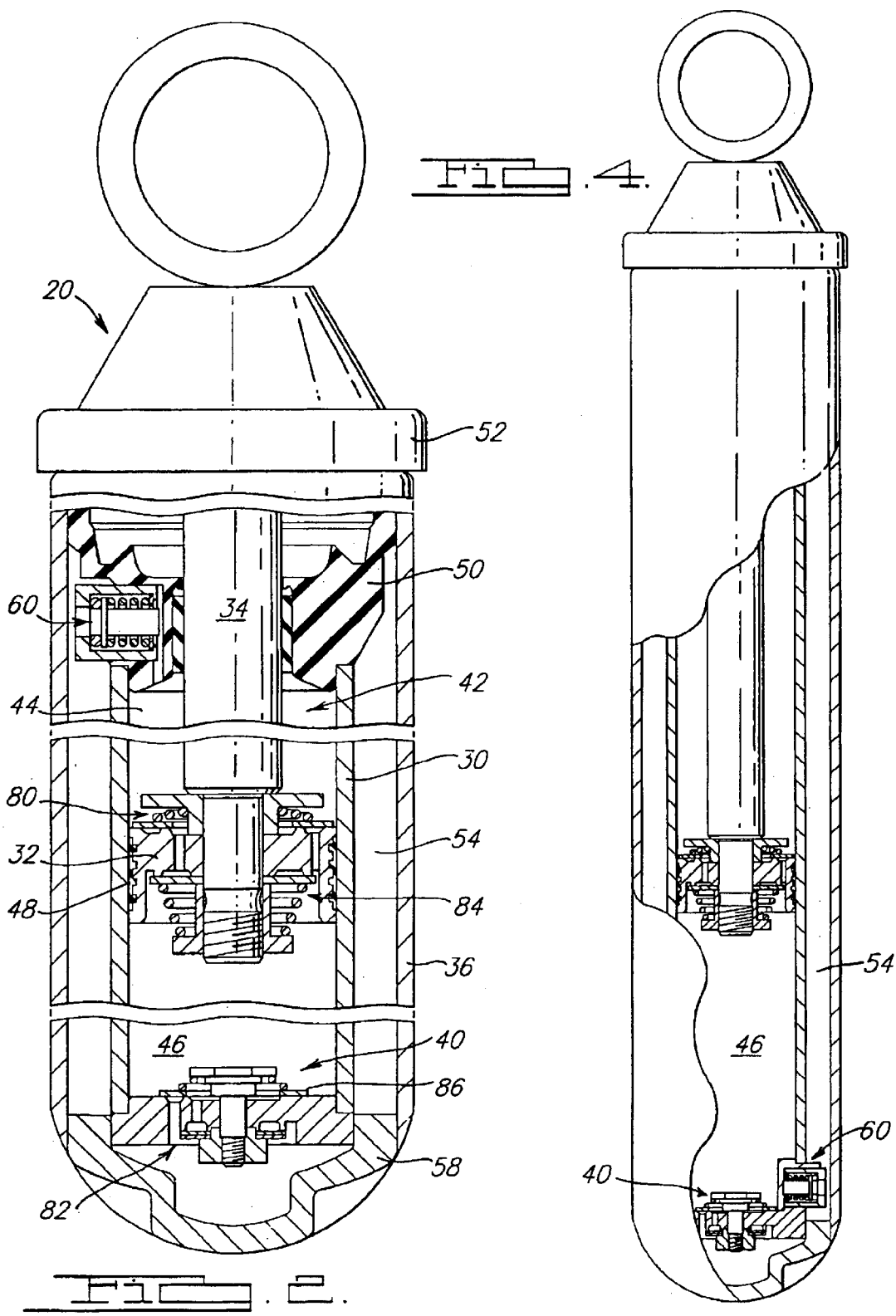

US 6,793,049 B2

ACCELERATION SENSITIVE DAMPING FOR AUTOMOTIVE DAMPERS

FIELD OF THE INVENTION

This application is a divisional application of Ser. No. 09/992,309 filed Nov. 19, 2001, now U.S. Pat. No. 6,581,733 the contents of which are hereby incorporated by reference.

BACKGROUND OF THE INVENTION

Shock absorbers are used in conjunction with automotive suspension systems to absorb unwanted vibrations which occur during driving. To absorb unwanted vibrations, shock absorbers are generally connected between the sprung portion (body) and the unsprung portion (suspension) of the automobile. A piston is located within a pressure tube of the shock absorber and is connected to the sprung portion of the automobile through a piston rod. The piston divides the pressure tube into an upper working chamber and a lower working chamber. Because the piston is able, through valving, to limit the flow of damping fluid between the upper and lower working chambers when the shock absorber is compressed or extended, the shock absorber is able to produce a damping force which counteracts the vibration which would otherwise be transmitted from the unsprung portion to the sprung portion of the automobile. In a dual tube shock absorber, a fluid reservoir is defined between the pressure tube and the reservoir tube. A base valve is located between the lower working chamber and the reservoir to limit the flow of fluid between the lower working chamber and the reservoir to produce a damping force which also counteracts the vibration which would otherwise be transmitted from the unsprung portion to the sprung portion of the automobile. The greater the degree to which the flow of fluid within the shock absorber is restricted by the piston valving or the base valve, the greater the damping forces which are generated by the shock absorber. Thus, a highly restricted flow of fluid would produce a firm ride while a less restricted flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant of the main springs of the vehicle as well as the spring constant of the seat, tires and the damping coefficient of the shock absorber. For optimum ride comfort, a relatively low damping force or a soft ride is preferred. Vehicle handling is related to the variation in the vehicle's attitude (i.e. roll, pitch and yaw). For optimum vehicle handling, relatively large damping forces or a firm ride are required to avoid excessively rapid variations in the vehicle's attitude during cornering, acceleration and deceleration. Road holding ability is generally a function of the amount of contact between the tires and the ground. To optimize road handling ability, large damping forces are required when driving on irregular surfaces to prevent loss of contact between the wheel and the ground for excessive periods of time.

Various methods for selectively changing the damping characteristics of a shock absorber in response to the operational characteristics of the vehicle have been developed. Continued development of shock absorbers have been directed towards simplified and low cost systems which effectively control the damping characteristics of the shock absorber in response to the varied operational characteristics of the vehicle.

SUMMARY OF THE INVENTION

The present invention provides the art with a dual or twin tube shock absorber which incorporate an acceleration sensitive valving system between the working tube and the reserve tube. The dual tube shock absorber is sensitive to accelerations imposed on the shock absorber during movement of the acceleration valve assembly.

Other advantages and objects of the present invention will become apparent to those skilled in the art of subsequent detailed description, appended claims and the drawings.

BRIEF DESCRIPTION OF THE DRAWINGS

In the drawings in which the best mode presently contemplated for carrying out the invention:

FIG. 2 is a cross-sectional view of the automatic damping system with the acceleration valve incorporated into the upper end cap;

FIG. 4 is a side view, partially in cross-section, of a shock absorber incorporating the automatically adjustable damping system in the base valve in accordance with another embodiment of the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
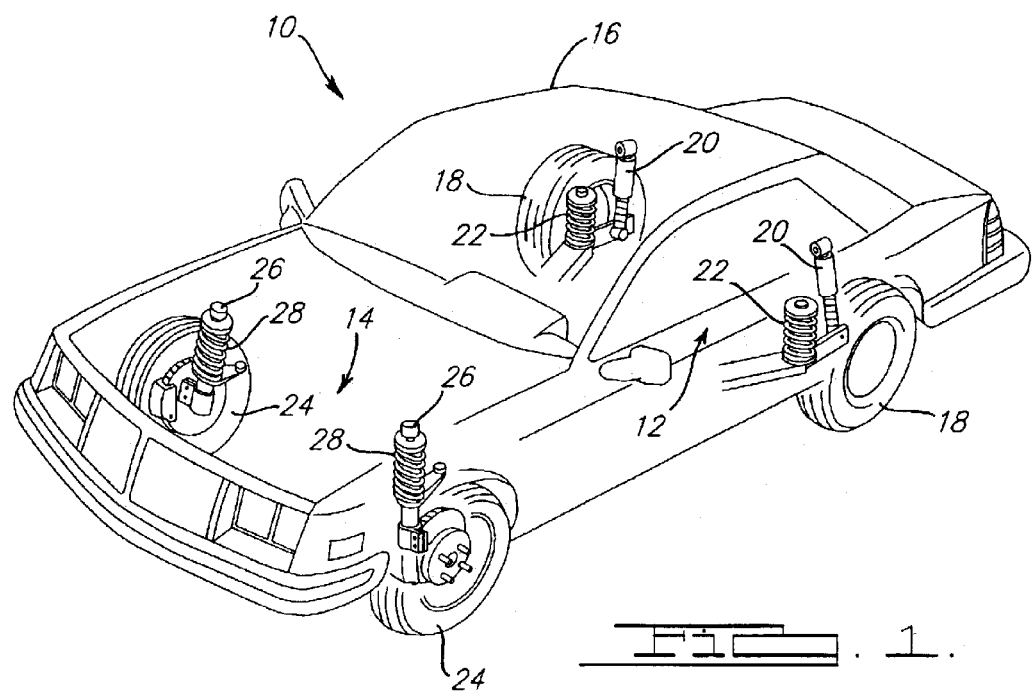
FIG. 1 is an illustration of an automobile using the automatically adjustable damping system in accordance with the present invention.

Referring now to the drawings in which like reference numerals designate like or corresponding parts throughout the several views, there is shown in FIG. 1 a vehicle incorporating a suspension system having the automatically adjustable shock absorbers in accordance with the present invention which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Referring now to FIG. 2, shock absorber 20 is shown in greater detail. While FIG. 2 shows only shock absorber 20, it is to be understood that shock absorber 26 also includes the piston, the base valving and the acceleration sensitive valving described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston 32, a piston rod 34, a reservoir tube 36 and a base valve assembly 40.

Pressure tube 30 defines a working chamber 42. Piston 32 is slidably disposed within pressure tube 30 and divides working chamber 42 into an upper working chamber 44 and a lower working chamber 46. A seal 48 is disposed between piston 32 and pressure tube 30 to permit sliding movement of piston 32 with respect to pressure tube 30 without generating undue frictional forces as well as sealing upper working chamber 44 from lower working chamber 46. Piston rod 34 is attached to piston 32 and extends through upper working chamber 44 and through an upper end cap 50 which closes the upper end of both pressure tube 30 and reservoir tube 36. A sealing system 52 seals the interface between upper end cap 50, reservoir tube 36 and piston rod 34. The end of piston rod 34 opposite to piston 32 is adapted to be secured to the sprung portion of vehicle 10. Valving within piston 32 controls the movement of fluid between upper working chamber 44 and lower working chamber 46 during movement of piston 32 within pressure tube 30. Because piston rod 34 extends only through upper working chamber 44 and not lower working chamber 46, movement of piston 32 with respect to pressure tube 30 causes a difference in the amount of fluid displaced in upper working chamber 44 than the amount of fluid displaced in lower working chamber 46. This difference in the amount of fluid displaced is known as the "rod volume" and it flows through base valve assembly 40.

Reservoir tube 36 surrounds pressure tube 30 to define a reservoir chamber 54 located between the tubes. The bottom end of reservoir tube 36 is closed by a lower end cap 58 which is adapted to be connected to the unsprung portions of vehicle 10. The upper end of reservoir tube 36 is attached to upper end cap 50. Base valve assembly 40 is disposed between lower working chamber 46 and reservoir chamber 54 to control the flow of fluid between the two chambers. When shock absorber 20 extends in length, an additional volume of fluid is needed in lower working chamber 46 due to the "rod volume" concept. Thus, fluid will flow from reservoir chamber 54 to lower working chamber 46 through base valve assembly 40. When shock absorber 20 compresses in length, an excess of fluid must be removed from lower working chamber 46 due to the "rod volume" concept. Thus fluid will flow from lower working chamber 46 to reservoir chamber 54 through base valve assembly 40.

Figures 3A, 3B:
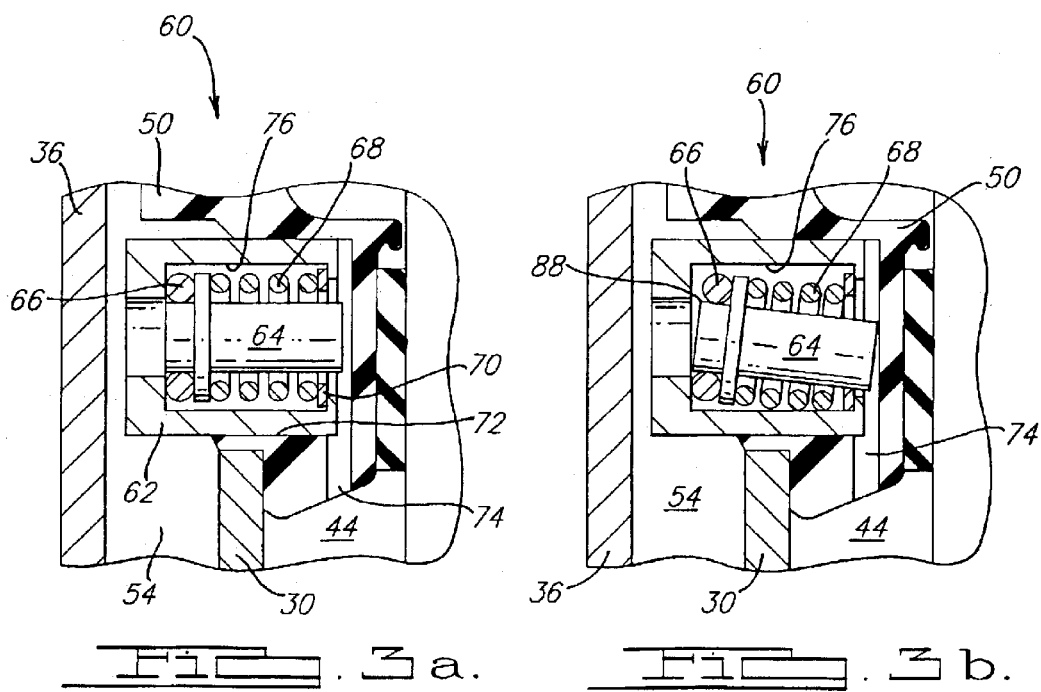
FIGS. 3a and 3b depict the acceleration valve as shown in FIG. 2 in its open and closed positions.

Referring now to FIGS. 2, 3a and 3b, an acceleration sensitive valve assembly 60 is incorporated into upper end cap 50. Acceleration sensitive valve assembly 60 comprises an outer housing 62, a valve body 64, a seal 66, a spring or biasing member 68 and a retainer 70. Upper end cap 50 is secured to the end of the pressure tube 30 and the end of reservoir tube 36 by being pressed into pressure tube 30 and reservoir tube 36 or by other means well known in the art. Outer housing 62 is press fit or otherwise secured within a bore 72 defined by upper end cap 50. A fluid passage 74 connects bore 72 with upper working chamber 44. Outer housing 62 defines a central cavity 76 which is in fluid communication with reservoir chamber 54, bore 72 and passage 74. Valve body 64 is disposed within cavity 76 and seal 66 is disposed between outer housing 62 and valve body 64 to seacavity 76 from reservoir chamber 54. Spring 68 is disposed between retainer 70 and valve body 64 to bias valve body 64 against seal 66 to maintain the seal between cavity 76 and reservoir chamber 54.

During a compression stroke for shock absorber 20, fluid within lower working chamber 46 is pressurized. A check valve assembly 80 associated with piston 32 allows fluid flow from lower working chamber 46 to upper working chamber 44. Due to the "rod volume" concept described above, during the compression stroke fluid flow must also occur from working chamber 44 to reservoir chamber 54 through base valve assembly 40. Base valve assembly 40 includes a compression valve assembly 82 which opens under the influence of fluid pressure within lower working chamber 46 to allow the fluid to flow from lower working chamber 46 to reservoir chamber 54. The damping forces generated by shock absorber 20 during a compression stroke are controlled by the design of compression valve assembly 82.

During a rebound stroke of shock absorber 20, fluid within upper working chamber 44 is pressurized. A rebound valve assembly 84 associated with piston 32 opens under influence of fluid pressure within upper working chamber 44 to allow the flow of fluid from upper working chamber 44 to lower working chamber 46. The damping forces generated by shock absorber 20 during a rebound stroke are controlled by the design of rebound valve assembly 84. Due to the "rod volume" concept described above, during the rebound stroke fluid flow must also occur from reservoir chamber 54 to lower working chamber 46. Base valve assembly 40 includes a check valve assembly 86 which allows fluid flow from reservoir chamber 54 to lower working chamber 46.

Acceleration sensitive valve assembly 60 functions during a rebound stroke to allow fluid flow from upper working chamber 44 to reservoir chamber 54 when shock absorber 20 experiences a prespecified amount of acceleration. This additional or secondary fluid flow reduces the stiffness of shock absorber 20 during the rebound stroke. As wheels 18 or 24 receive an input, reservoir tube 36, pressure tube 30 and upper end cap 50 are accelerated. This acceleration works on the mass of valve body 64 perpendicular to the longitudinal axis of valve body 64, resulting in a moment about seal 66 due to the overhanging mass feature of valve body 64. Spring 68 also creates a moment about seal 66. At the point where the acceleration induced moment exceeds the spring force induced moment, valve body 64 becomes unstable and rotates about the edge of seal 66 resulting in a hydraulic leak path 88 as shown in FIG. 3b. When leak path 88 is open, hydraulic fluid flows from upper working chamber 44, through passage 74 and through cavity 76 into reservoir chamber 54. This flow reduces the hydraulic fluid pressure within upper working chamber 44 resulting in lower damping forces and a softer ride.

The configuration of valve body 64 is such that hydraulic pressure within upper working chamber 44 will work to stabilize valve body 64. As damper velocity increases and therefore hydraulic pressure, greater and greater wheel accelerations will be necessary to destabilize valve body 64. This characteristic will tend to "filter" the wheel inputs that destabilize valve body 64, effectively reducing a valve sensitivity to those inputs inducing a high frequency, low amplitude signal at the connection of shock absorber 20 to the unsprung mass of the vehicle.

Referring now to FIG. 4, an alternative embodiment of the present invention is illustrated. In FIG. 4, acceleration sensitive valve assembly 60 is illustrated as being incorporated into base valve assembly 40 between lower working chamber 46 and reservoir chamber 54. In this position, acceleration sensitive valve assembly 60 reacts to acceleration forces during a compression stroke to reduce the damping forces and provide a soft ride in the same manner as that described above when valve assembly 60 is located within upper end cap 50.

While not specifically illustrated, it is within the scope of the present invention to provide acceleration sensitive valve assembly 60 in both upper end cap 50 and base valve assembly 40 to provide variable damping in both rebound and compression if desired.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A damper comprising:

a pressure tube forming a working chamber operable to store damping fluid, said pressure tube defining a damper axis;

a reservoir tube disposed around said pressure tube, said reservoir tube forming a reservoir chamber between said pressure tube and said reservoir tube;

a base valve assembly disposed between said working chamber and said reservoir chamber, said base valve assembly defining a first and second normally closed flow passage for allowing fluid flow from said working chamber to said reservoir chamber, said first flow passage including means for opening said first flow passage due to fluid pressure within said working chamber, said second flow passage including a valve body disposed within said second flow passage for opening said second flow passage due to acceleration of said base valve assembly, said valve body defining a valve axis, said valve body being movable between a first position where said valve axis is not perpendicular to said damper axis and said second flow passage is open and a second position where said valve axis is perpendicular to said damper axis and said second flow passage is closed.

2. The damper according to claim 1 wherein said base valve assembly comprises:

an outer housing defining a cavity in communication with said reservoir chamber and said working chamber;

said valve body being disposed within said cavity.

3. The damper according to claim 2 wherein said valve body is biased towards said second position.

4. The damper according to claim 1 further comprising a piston disposed within said working chamber, said piston dividing said working chamber into an upper portion and a lower portion, said first and second flow passages allowing fluid flow from said lower portion of said working chamber to said reservoir chamber.

5. The damper according to claim 1 wherein said base valve assembly defines a third flow passage for allowing fluid flow from said reservoir chamber to said working chamber and a check valve assembly for prohibiting fluid flow from said working chamber to said reservoir chamber.

6. An acceleration responsive assembly for a damper having a pressure tube defining a working chamber and a damper axis, a reservoir tube disposed around said pressure tube forming a reservoir chamber, and an end cap attached to said pressure tube, said acceleration responsive assembly comprising:

an outer housing defining a first flow passage between said working chamber and said reservoir chamber, said outer housing being mounted to said end cap;

a valve body disposed within said first flow passage, said valve body being responsive to acceleration of said end cap to open said first flow passage, said valve body defining a valve axis, said valve body being movable between a first position where said valve axis is not perpendicular to said damper axis and said first flow passage is open and a second position where said valve axis is perpendicular to said damper axis and said first flow passage is closed.

7. The acceleration responsive assembly according to claim 6 wherein said acceleration responsive assembly comprises a biasing member urging said valve body into said second position.

* * * * *

UNITED STATES PATENT AND TRADEMARK OFFICE
CERTIFICATE OF CORRECTION

PATENT NO.    : 6,793,049 B2
DATED         : September 21, 2004
INVENTOR(S)   : Karl Kazmirski It is certified that error appears in the above-identified patent and that said Letters Patent is hereby corrected as shown below:

Column 1,
Line 6, insert -- The present invention relates generally to automotive dampers or shock absorbers which receive mechanical shock. More particularly, the present invention relates to automotive dampers or shock absorbers which are sensitive to accelerations imposed upon the damper or shock absorber to switch between a firm and a soft damping characteristic --

Column 3,
Line 64, "seacavity" should be -- seal cavity --

Signed and Sealed this

Twelfth Day of April, 2005

JON W. DUDAS
*Director of the United States Patent and Trademark Office*